United States Patent
Hao et al.

(10) Patent No.: US 8,595,319 B2
(45) Date of Patent: Nov. 26, 2013

(54) HOME NETWORK VIDEO PEER-TO-PEER FOR MOBILE DEVICES

(75) Inventors: Jack Jianxiu Hao, Lexington, MA (US); Fenglin Yin, Lexington, MA (US); Okeno R. Palmer, Woburn, MA (US); Zhiying Jin, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 286 days.

(21) Appl. No.: 12/903,567

(22) Filed: Oct. 13, 2010

(65) Prior Publication Data
US 2012/0096121 A1   Apr. 19, 2012

(51) Int. Cl.
*G06F 15/16*   (2006.01)

(52) U.S. Cl.
USPC ........................................ 709/217

(58) Field of Classification Search
USPC ........................................ 709/217
See application file for complete search history.

(56) References Cited

U.S. PATENT DOCUMENTS

| | | | | |
|---|---|---|---|---|
| 7,912,309 B2 * | 3/2011 | Weaver | | 382/254 |
| 8,144,182 B2 * | 3/2012 | Shoemake et al. | | 348/14.04 |
| 2005/0204019 A1 * | 9/2005 | Flynn et al. | | 709/219 |
| 2006/0156409 A1 * | 7/2006 | Chladek | | 726/26 |
| 2007/0053653 A1 * | 3/2007 | Huntington | | 386/46 |
| 2008/0155061 A1 * | 6/2008 | Afergan et al. | | 709/218 |
| 2008/0168507 A1 * | 7/2008 | Teramoto et al. | | 725/74 |
| 2008/0189751 A1 * | 8/2008 | Weaver | | 725/105 |
| 2008/0253564 A1 * | 10/2008 | Kahn et al. | | 380/200 |
| 2009/0178091 A1 * | 7/2009 | Miyamoto et al. | | 725/91 |
| 2009/0254659 A1 * | 10/2009 | Li et al. | | 709/225 |
| 2010/0008252 A1 * | 1/2010 | Alve | | 370/252 |
| 2010/0229222 A1 * | 9/2010 | Li et al. | | 726/5 |
| 2010/0250704 A1 * | 9/2010 | Kittel | | 709/219 |
| 2012/0096128 A1 * | 4/2012 | Maloo | | 709/219 |

* cited by examiner

*Primary Examiner* — Alicia Baturay

(57) ABSTRACT

A device receives, from a user device, a request for content from a home network, and sends a notification of the request for content to a home network device. The device receives, from the home network device, a selection list of particular content, provides, to the user device, the selection list, and receives, from the user device, a content selection from the selection list. The device sends, to the home network device, the content selection, and receives, from the home network device, an indication that content corresponding to the content selection has been uploaded to a content delivery network. The device sends, to the user device, instructions to retrieve the content from the content delivery network.

20 Claims, 8 Drawing Sheets

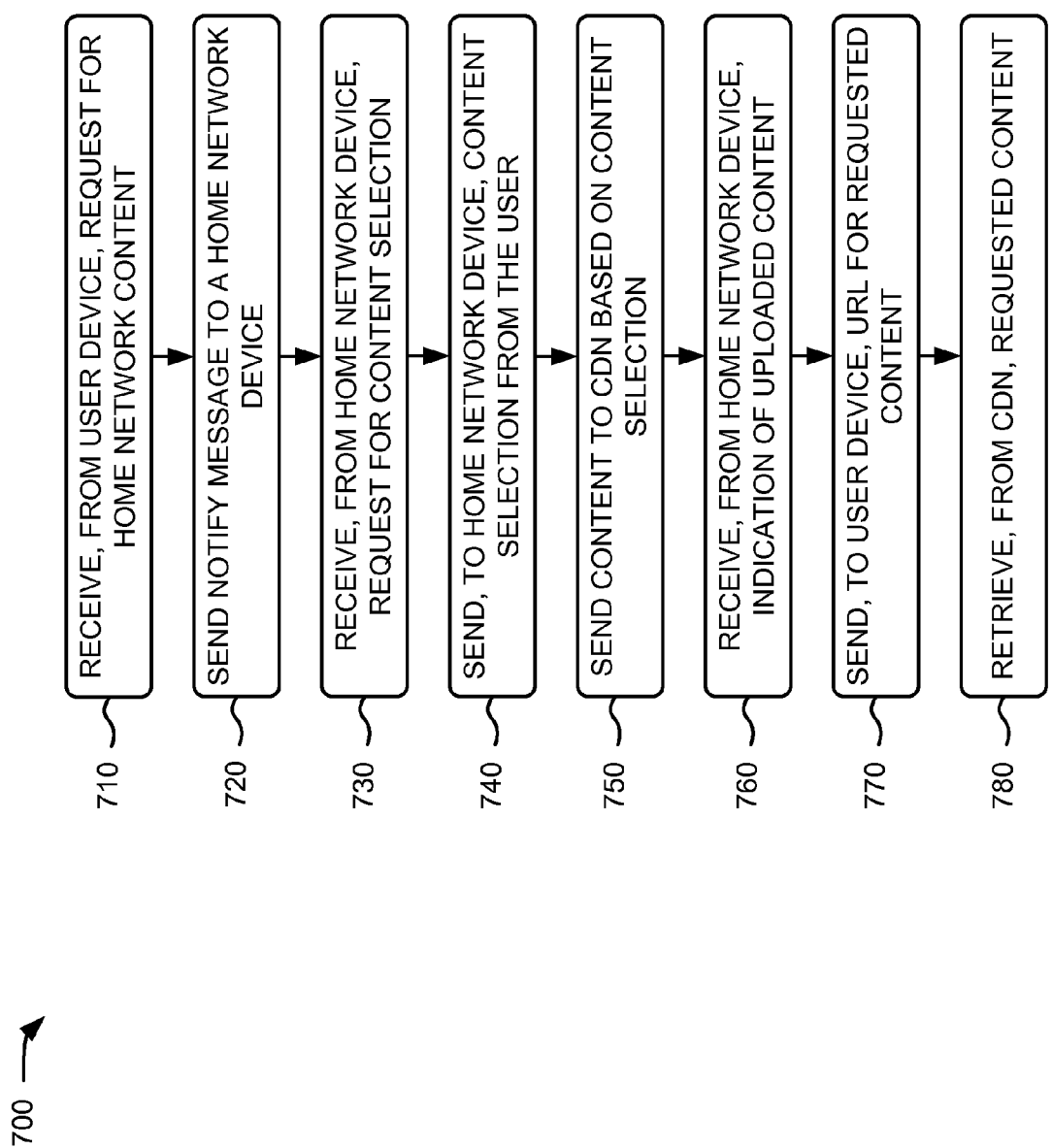

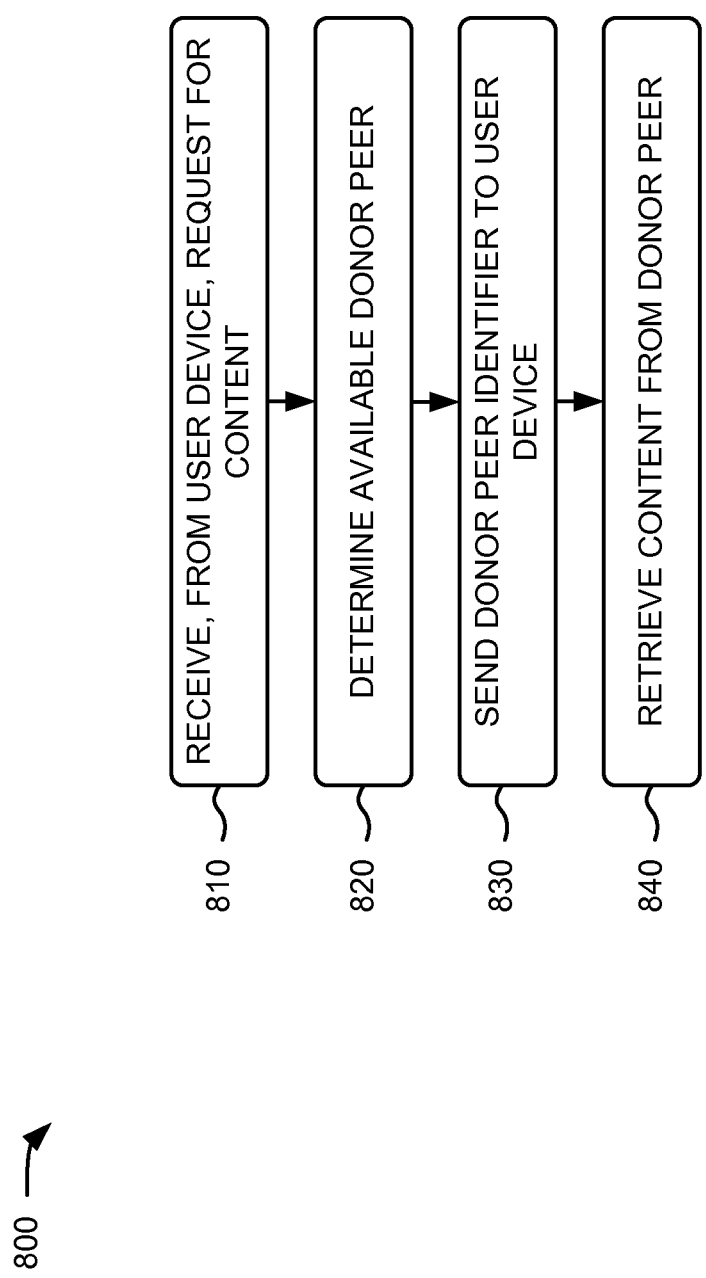

HOME NETWORK VIDEO PEER-TO-PEER FOR MOBILE DEVICES

BACKGROUND

As wireless network data rates improve using third generation (3G), fourth generation (4G), and WiFi technologies, users are using wireless networks for more and more bandwidth-intensive applications. Delivery of video content is becoming more popular with applications provided via mobile communication devices, such as smart phones (e.g., the Motorola DROID, the iPhone, etc.). Some video content may be stored within a user's home network. Delivery of content from a home network to a mobile communication device presents challenges, since many of the home networks, for security reasons, are configured to not be accessible from the Internet.

BRIEF DESCRIPTION OF THE DRAWINGS

FIG. 7 is a flow chart of an example process for delivering mobile content from a home network according to an implementation described herein; and FIG. 8 is a flow chart of an example process for optimizing mobile content delivery according to another implementation described herein.

DETAILED DESCRIPTION OF PREFERRED EMBODIMENTS

Figure 1:
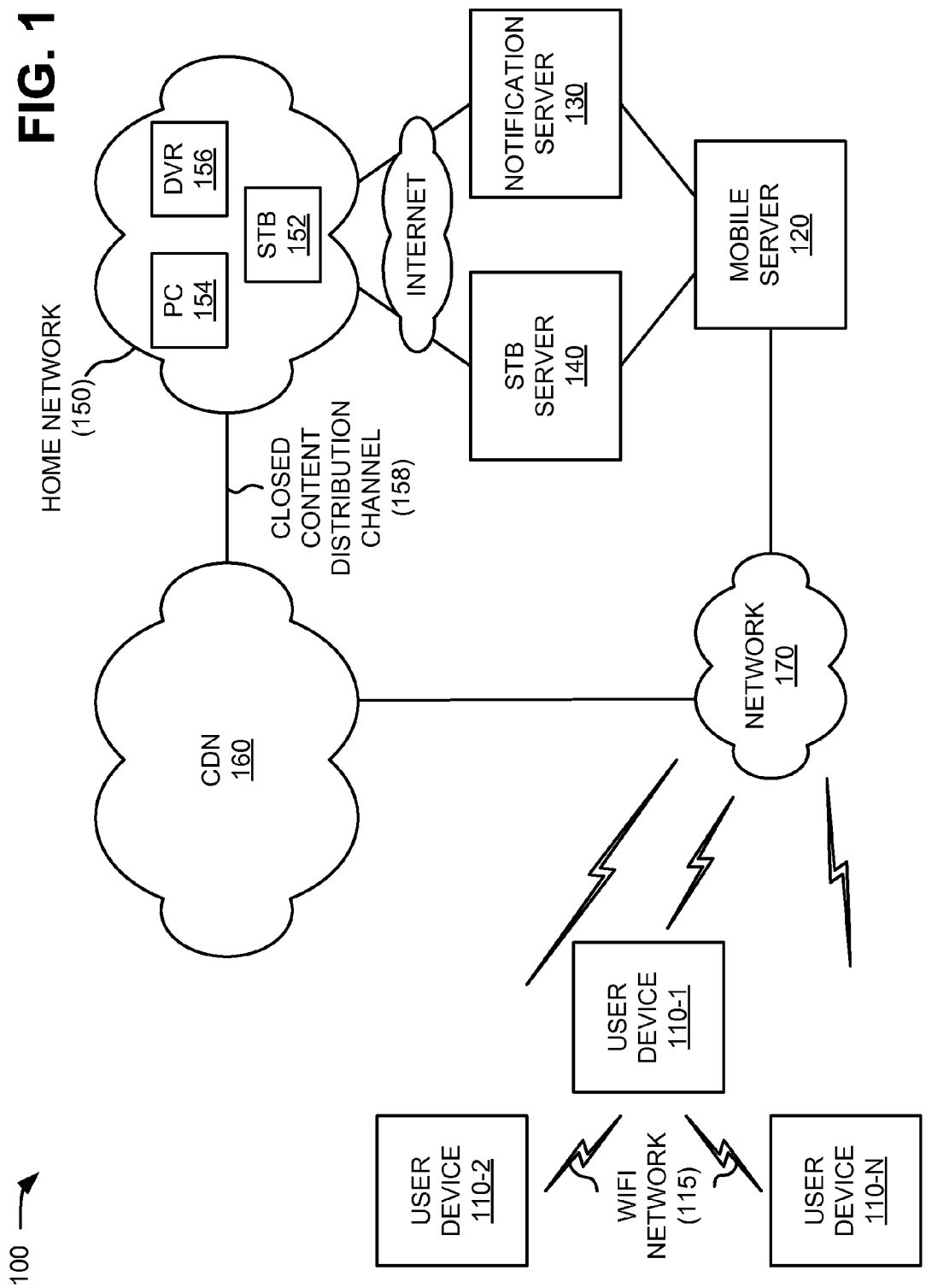
FIG. 1 is a diagram of an example network in which systems and/or methods described herein may be implemented.

The following detailed description refers to the accompanying drawings. The same reference numbers in different drawings may identify the same or similar elements. Also, the following detailed description does not limit the invention.

Systems and/or methods described herein may provide a user device (e.g., a mobile handset) access to content within a secure home network. A user device may request content from a mobile server, which may communicate with one or more other servers to request communications with the home network. The content may be uploaded to a temporary storage location from where the user device may retrieve the content. In an implementation, the user device may include WiFi capability (also called "mobile WiFi," "MiFi," or an "intelligent mobile hotspot") to allow the user device to act as a donor peer for other nearby user devices (or "target peers") downloading the same content. Instead of using a wireless access network (e.g., a 3G or 4G network as defined by the Third Generation Partnership Project (3GPP)), the target peers may use a mobile WiFi network to retrieve content from the donor peer.

In one example implementation, the systems and/or methods described herein may receive, from a user device, a request for content from a home network, and may send a notification of the request for content to a home network device. The systems and/or methods may receive, from the home network device, a selection list of particular content; may provide, to the user device, the selection list; and may receive, from the user device, a content selection from the selection list. The systems and/or methods may send, to the home network device, the content selection, and may receive, from the home network device, an indication that content corresponding to the content selection has been uploaded to a content delivery network. The systems and/or methods may send, to the user device, instructions to retrieve the content from the content delivery network.

The systems and/or methods described herein may, thus, provide mobile device users with access to content within their home networks that do not have direct Internet access. Furthermore, systems and/or methods described herein may minimize use of wireless access network resources among multiple user devices consuming the same content.

As used herein, the terms "mobile WiFi" and "MiFi" may be used interchangeably to refer to mobile user devices acting like a WiFi router (e.g., using IEEE 802.11 standards). MiFi devices may connect to 3G and/or 4G wireless access networks to send/receive signals that allow Internet connectivity. The MiFi devices may share that connection, through WiFi in a limited radius (e.g., 30-200 feet), with other WiFi enabled devices. Also, as used herein, the terms "subscriber" and/or "user" may be used interchangeably. Furthermore, the terms "subscriber" and/or "user" are intended to be broadly interpreted to include a user device (e.g., a mobile communication device) or a user of a user device.

FIG. 1 is a diagram of an example network 100 in which systems and/or methods described herein may be implemented. As illustrated, network 100 may include multiple user devices 110-1, 110-2, . . . , 110-N (referred to herein collectively as "user devices 110" or generically as "user device 110"); a mobile server 120; a notification server 130; a set-top box (STB) server 140; a home network 150; a content distribution network (CDN) 160, and a network 170. Components of network 100 may interconnect via wired and/or wireless connections. Three user devices 110 and a single mobile server 120, notification server 130, STB server 140; home network 150; CDN 160, and network 170 have been illustrated in FIG. 1 for simplicity. In practice, there may be more user devices 110, mobile servers 120, notification servers 130, STB servers 140, home networks 150, CDNs 160, and/or networks 170.

User device 110 may include any device that is capable of communicating with mobile server 120, notification server 130, STB server 140, and/or CDN 160 via a wireless access network (e.g., network 170). For example, user device 110 may include a mobile computation and/or communication device, such as a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smart phone, a laptop computer (e.g., with a wireless air card), a global positioning system (GPS) device, a content recording device (e.g., a camera, a video camera, etc.), etc.

User device 110 may further include a device that is capable of communicating with other user devices 110 using a local wireless network, such as a WiFi network 115, to provide content to other user devices 110 and/or to obtain content from other user devices 110. In one implementation, user device 110 may include a MiFi-enabled device that may share stored content or content stream over a 3G/4G network connection with other user devices 110 through WiFi network 115.

Mobile server 120 may include one or more server devices, or other types of computation or communication devices, that gather, process, and/or provide information in a manner described herein. For example, mobile server 120 may include a device that is capable of communicating with user device 110 (e.g., via network 170) and with the Internet (not shown). In one implementation, mobile server 120 may receive a content request (e.g., for video content) from user device 110. Mobile server 120 may authenticate user device 110 (e.g., based on login information) and provide a "get" message, via notification sever 130, to a home network (e.g., home network 150) associated with the content request. As described further herein, mobile server 120 may receive, from STB server 140, an indication that the requested content has been uploaded to a CDN (e.g., CDN 160). Mobile server 120 may also forward the content request (e.g., from user device 110) to STB server 140. In one implementation, mobile server 120 may provide a content link (e.g., a link to request secure delivery of the requested content by CDN 160) to user device 110 via a secure connection (e.g., a hypertext transfer protocol secure (HTTPS) connection). In another implementation, mobile server 120 may provide requested content (e.g., received from STB server 140) to user device 110. In still another implementation, mobile server 120 may provide, to an authenticated user device 110, decryption keys for protected content.

Notification server 130 may include one or more server devices, or other types of computation or communication devices, that gather, process, and/or provide information in a manner described herein. For example, notification server 130 may receive, from mobile server 120, a "get" message to forward to a home network (e.g., home network 150) associated with a content request from user device 110. Notification server 130 may be provided in the Internet, while home network 150 may have no direct connection to the Internet (e.g., for security purposes). Therefore, a notification mechanism may be deployed between notification server 130 and home network 150. The "get" message may serve as a ping-like message to which a device within home network 150 may react. Notification server 130 may send a "get" message when user device 110 initiates a connection to home network 150 to retrieve content. In response to the "get" message, a device within home network may connect with STB server 140 to complete a content request transaction.

STB server 140 may include one or more server devices, or other types of computation or communication devices, that gather, process, and/or provide information in a manner described herein. For example, STB server 140 may communicate with mobile server 120 and home network 150 to provide instructions for responding to a content request from user device 110. In one implementation, STB server 140 may receive, from home network 150, a content link identifying where requested content may be retrieved by user device 110. In another implementation, STB server 140 may receive, from home network 150, the actual content requested by user device 110. STB server 140 may forward the content link and/or the requested content to mobile server 120 for delivery to user device 110.

Home network 150 may include one or more devices that may store personal content (e.g., digital video recorder (DVR) content, home videos, photographs, etc.) associated with a user of a user device 110. Home network 150 may include, for example, one or more STBs 152, personal computers (PC) 154, and/or digital video recorders (DVR) 156.

Home network 150 may also include other devices, such as additional media storage devices, a gateway, and/or a home router (not shown). Home network 150 may store content, such as personal videos, images, and/or other multimedia content. In an implementation, home network 150 may connect to CDN 160 via a closed content distribution channel 158. Closed content distribution channel 158 may be implemented through a subscription multimedia service providing network access through local set-top boxes (e.g., STB 152). Closed content distribution channel 158 may include, for example, cable, optical fiber, satellite or virtual private networks. In one implementation, home network 150 may send stored content to CDN 160 via closed content distribution channel 158. Home network 150 may also receive unsolicited communications from notification server 130 in the form of a "get" notification message.

STB 152 may be a closed device (e.g., including a hardware/software configuration that is not accessible to the general public) that restricts unauthorized alteration of programming delivered over closed content distribution channel 158. STB 152 may receive data, such as a video signal, may convert the video signal to a form usable by an output device (e.g., a television), and may transmit the converted video signal to the output device for display. STB 152 may also retrieve data, such a video content, from PC 154, DVR 156, or another storage device within home network 150. In one implementation, STB 152 may receive a "get" message from notification server 130 and, in response, may initiate a session with STB server 140 to complete a content request transaction. For example, in response to a "get" message, STB 152 may contact STB server 140 to retrieve details of a content request from user device 110. Based on the details of the content request, STB 152 may upload the requested content to CDN 160 and/or to STB server 140. If STB 152 uploads the content to CDN 160, STB 152 may provide a content link (e.g., a link that requests secure delivery of the requested content by CDN 160) to STB 140 to provide to user device 110.

PC 154 and DVR 156 may include, for example, storage devices that may record and/or store content (e.g., recorded video and other multimedia). In one implementation, STB 152 may retrieve multimedia content from PC 154 and/or DVR 156 in response to a content request from user device 110.

CDN 160 may include a network-based storage cloud of content, such as personal video content, public video content, and/or other multimedia content. CDN 160 may include a computer system, an application, a cable head-end, and/or a broadcasting device capable of providing video content in a variety of formats, instructions, and/or other information. CDN 160 may include, for example, one or more servers and/or databases to temporarily store and provide content that is the subject of a content request from user device 110. CDN 160 may also include one or more transcoding servers that may transcode (or convert) video content to a format that user device 110 may utilize (e.g., playback). In one example, CDN 160 may receive content from home network 150 (e.g., STB 152) for temporary storage, may store the content, and may provide, to home network 150, a content link associated with the stored content. CDN 160 may receive a request for video content (e.g., the content link) from user device 110, and may provide the requested video content to user device 110 (e.g., in a format suitable for user device 110).

Network 170 may include any type of network, such as a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks. Network 170 may provide services and/or resources to facilitate communications between user device 110, mobile server 120, and/or CDN 160. In one example implementation, network 170 may provide a wireless access network for user device 110. The wireless access network, in one implementation, may correspond to a 4G network, a Long Term Evolution (LTE) network, an advanced LTE network, etc. The wireless access network may include a communications network that connects subscribers (e.g., user device 110) to a service provider (e.g., mobile server 120 and/or CDN 160). In another implementation, the wireless access network may include a WiFi network or other access networks (e.g., an enhanced high-rate packet data (eHRPD) network or a WiMax network).

Although FIG. 1 shows example components of network 100, in other implementations, network 100 may include fewer components, different components, differently arranged components, and/or additional components than those depicted in FIG. 1. Alternatively, or additionally, one or more components of network 100 may perform one or more other tasks described as being performed by one or more other components of network 100. For example, in one implementation, the functions of mobile server 120, notification server 130, and STB server 140 may be combined in a single device.

Figure 2:
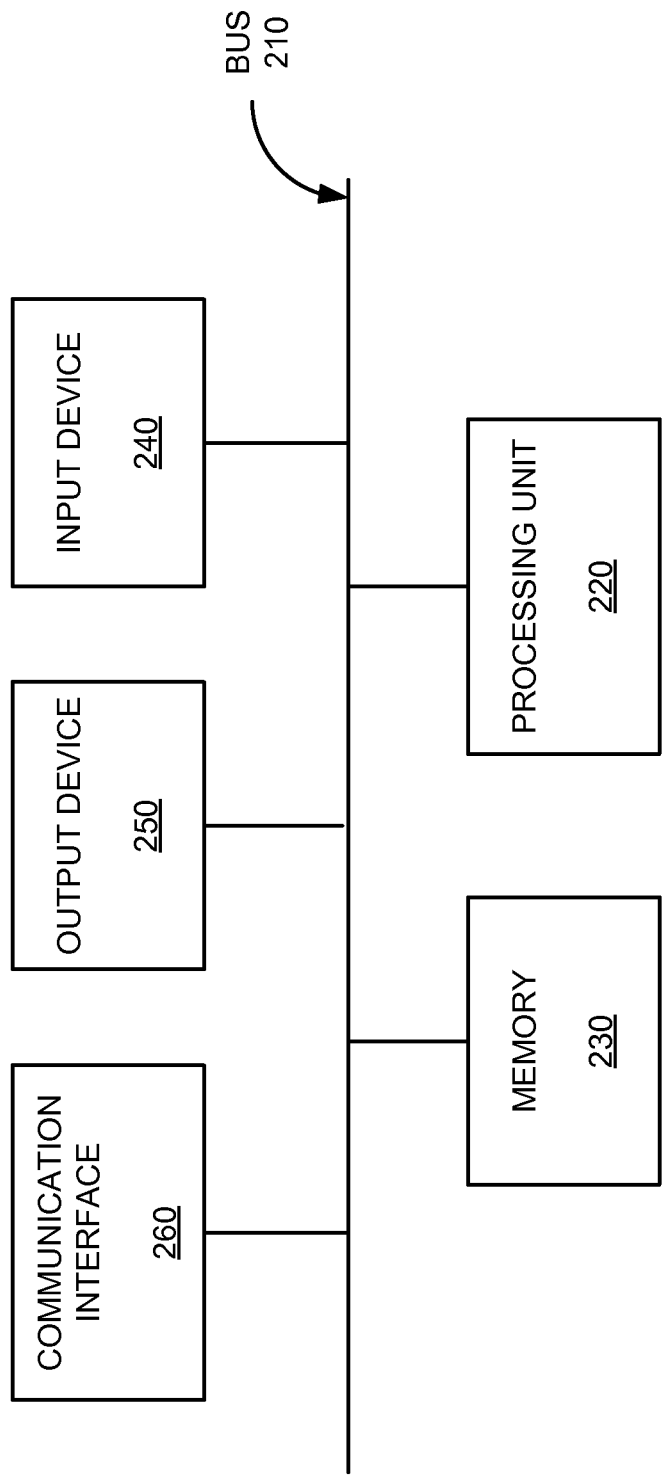
FIG. 2 is a diagram of example components of one or more of the devices of the network depicted in FIG. 1.

FIG. 2 is a diagram of example components of a device 200 that may correspond to one of the devices of network 100. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
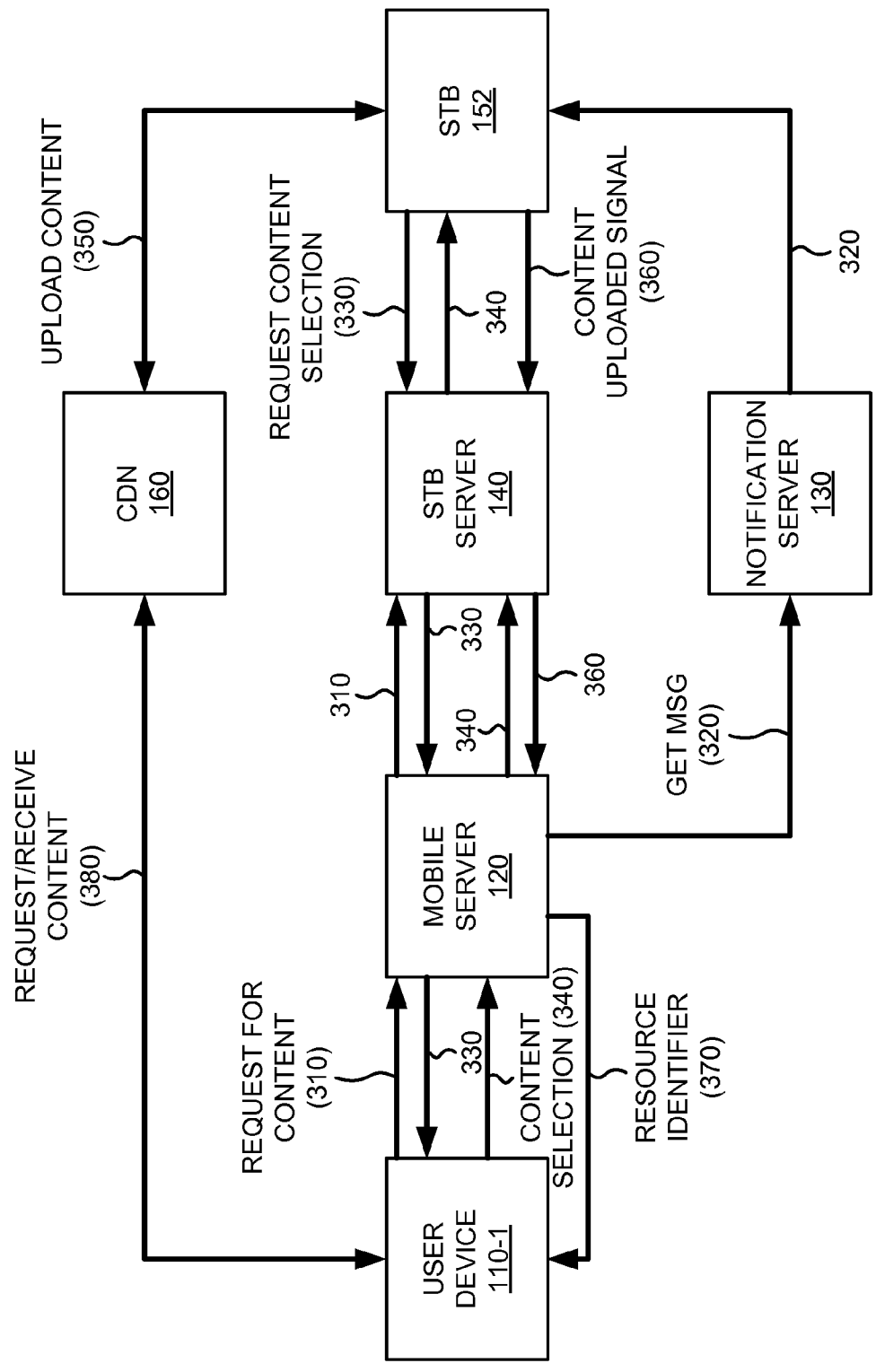
FIG. 3 is a diagram of example interactions between components of an example portion of the network depicted in FIG. 1.

FIG. 3 depicts a diagram of example interactions among components of an example portion 300 of network 100. As illustrated, example network portion 300 may include a donor user device 110-1, mobile server 120, notification server 130, STB server 140, STB 152, and CDN 160. User device 110-1, mobile server 120, notification server 130, STB server 140, STB 152, and CDN 160 may include the features described above in connection with one or more of FIGS. 1 and 2.

As further shown in FIG. 3, the user (not shown) may utilize user device 110-1 to send a request 310, to mobile server 120, for content stored within a home network (e.g., on or accessible to STB 152). In one implementation, user device 110-1 may communicate with mobile server 120 through a hypertext transfer protocol over secure socket (HTTPS) layer using network 170 (not shown). Request for content 310 may include, for example, an operation command (e.g., a "get_content" command), credentials associated with user device 110-1 (e.g., a mobile directory number (MDN) and/or a personal access code for the STB associated with the requested content), an identifier (e.g., a unique device number) for the STB associated with the requested content, a region identifier, and/or other information to facilitate a content request transaction.

Mobile server 120 may receive request for content 310 and may forward request for content 310 to STB server 140. Mobile server 120 may also generate a "get" message 320 that may be sent, via notification server 130, to STB 152. "Get" message 320, may include, for example a ping-like message that causes STB 152 to establish a connection with STB server 140. In response to "get" message 320, STB 152 may connect to STB server 140 and may request additional information (e.g., a particular file name), as indicated by request content selection 330. For example, request content selection 330 may include a list of content available for downloading (e.g., content previously stored by or currently streamed to STB 152). Request content selection 330 may be forwarded by STB server 140 and mobile server 120 to user device 110-1 for presentation to the user.

The user may select an item from the list of available content and user device 110-1 may forward, to mobile server 120, the selection as content selection 340. Content selection 340 may include, for example, a title or other identifier for the selected content. In one implementation, content selection 340 may also include a delivery format for the selected content. In another implementation, content selection 340 may include instructions to deliver real-time content or perform a recording of future content. Mobile server 120 may receive content selection 340 and may forward content selection 340 to STB server 140, which, in turn, may forward content selection 340 to STB 152.

In response to content selection 340, STB 152 may upload the requested content to CDN 160 (e.g., via closed content distribution channel 158), as indicated by reference number 350. In one implementation, uploaded content 350 may be stored in a temporary storage location within CDN 160. Once STB 152 has completed uploading requested content 350, STB 152 may send, to STB server 140, a content uploaded signal 360 to indicate that requested content 350 (e.g., identified by content selection 340) has been uploaded to CDN 160. In one implementation, uploaded content signal 360 may include a file name, uniform resource locator (URL), or another identifier for the uploaded content. STB server 140 may forward uploaded content signal 360 to mobile server 120.

Mobile server 120 may receive uploaded content signal 360 and, if necessary, combine uploaded content signal 360 with other information, to generate a resource identifier 370. Resource identifier 370 may include, for example, a uniform resource identifier (URI), an IP address, a private network address, or other indicator, to enable user device 110-1 generate a request to CDN 160 to obtain the requested content. User device 110-1 may receive resource identifier 370, and may send, over a private network connection, a request for the desired content, as indicated by reference number 380. User device 110-1 may receive the desired content over the private network connection, as further indicated by reference number 380.

Although FIG. 3 shows example components of network portion 300, in other implementations, network portion 300 may include fewer components, different components, differently arranged components, and/or additional components than depicted in FIG. 3. Alternatively, or additionally, one or more components of network portion 300 may perform one or more other tasks described as being performed by one or more other components of network portion 300.

Figure 4:
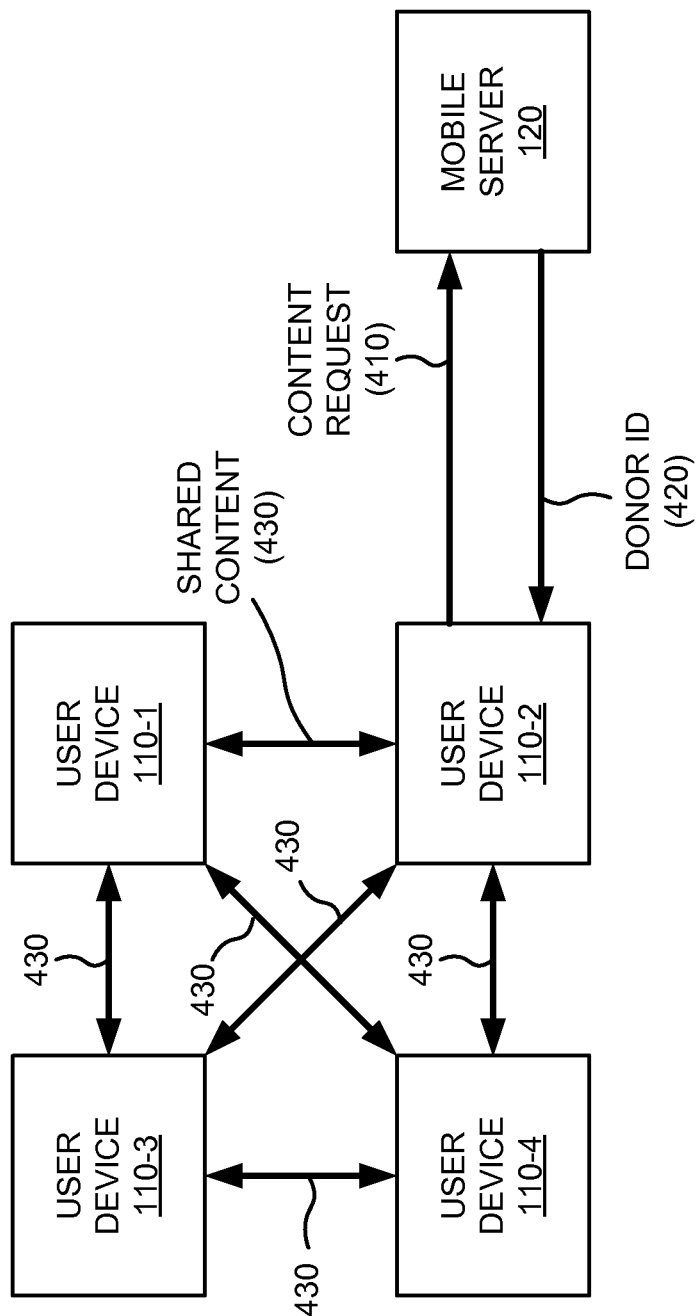
FIG. 4 is a diagram of example interactions between components of another example portion of the network depicted in FIG. 1.

FIG. 4 depicts a diagram of example interactions among components of another example portion 400 of network 100. As illustrated, example network portion 400 may include user devices 110-1 through 110-4 and mobile server 120. User devices 110-1 through 110-4 and mobile server 120 may include the features described above in connection with one or more of FIGS. 1-3. Interactions shown in FIG. 4 may represent communications to support delivery of content from a donor peer (e.g., user device 110-1) to one or more target peers (e.g., user devices 110-2, 110-3, and/or 110-4). Assume a user of donor user device 110-1 has previously stored content through a previous transaction, such as the content delivery process described in FIG. 3 or through a peer-to-peer transaction as described herein.

Target user device 110-2 may send a request 410 for content to mobile server 120 (e.g., using a URL for mobile server 120) to request desired content. In one implementation, target user device 110-2 may send content request 410 as a HTTPS data call over a 3G/4G wireless network via network 170. Mobile server 120 may check if there is a nearby user device (e.g., donor user device 110-1) with WiFi capability that that has already downloaded the content listed in content request 410. The content may be stored, for example, in a memory (e.g., memory 230) of donor user device 110-1. Donor peer selection is described further below, for example, in connection with FIG. 6.

If a suitable donor peer (e.g., donor user device 110-1) is identified, mobile server 120 may direct, via a donor identifier 420, target user device 110-2 to retrieve the requested content from donor user device 110-1. In one implementation, donor identifier 420 may include a unique indicator (e.g., an IP address) for donor user device 110-1. In another implementation, mobile server 120 may also send a target user device identifier (not shown), to donor user device 110-1, to instruct that the requested content be sent to target user device 110-2. That is, mobile server 120 may introduce donor user device 110-1 and target user device 110-2 to make a peer-to-peer connection.

Target user device 110-2 may receive donor identifier 420 and may establish, based on donor identifier 420, a session to obtain shared content 430 from donor user device 110-1. In one implementation, donor user device 110-1 may share the content requested by target user device 110-2 over a local wireless network (e.g., WiFi network 115). Target user device 110-2 may receive shared content 430 and present shared content 430 to the user.

In one implementation, any of user devices 110-1 through 110-4 (e.g., a user device with MiFi capability) may act as an HTTP server to deliver content to a target user device 110 requesting the same content. Thus, multiple user devices 110 may provide a mesh MiFi network (e.g., as directed by mobile server 120) to share content with mobile peers. In another implementation, user devices 110-1 through 110-4 may act as both donor and target peers. For example, both user device 110-1 and user-device 110-2 may download (e.g., from CDN 160, as described above in connection with FIG. 3, or from another donor user device, as described in connection with FIG. 4) different pieces of the same requested content. User device 110-1 and user-device 110-2 may use mobile WiFi network 115 to share and combine the pieces so as to provide the complete requested content to each user of user device 110-1 and user-device 110-2.

Although FIG. 4 shows example components of network portion 400, in other implementations, network portion 400 may include fewer components, different components, differently arranged components, and/or additional components than depicted in FIG. 4. Alternatively, or additionally, one or more components of network portion 400 may perform one or more other tasks described as being performed by one or more other components of network portion 400.

Figure 5:
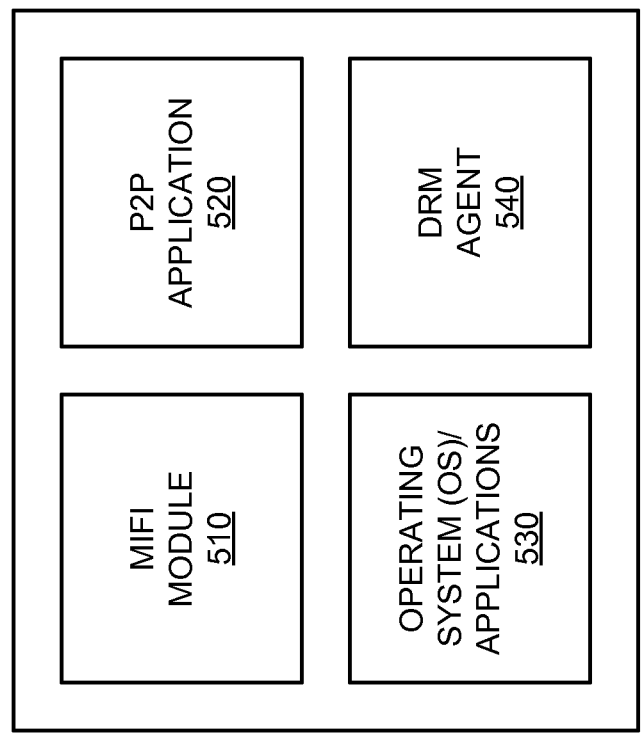
FIG. 5 is a diagram of example functional components of a user device of the network depicted in FIG. 1.

FIG. 5 is a diagram of example functional components of user device 110. In one implementation, the functions described in connection with FIG. 5 may be performed by one or more components of device 200 (FIG. 2). As shown in FIG. 5, user device 110 may include a MiFi module 510, a peer-to-peer (P2P) application 520, operating system (OS)/applications 530, and a Digital Rights Management (DRM) agent 540.

MiFi module 510 may include hardware or a combination of hardware and software that may enable user device 110 to act as a WiFi router for other user devices 110. In one implementation, MiFi module 510 may receive signals from mobile server 120 via a 3G/4G wireless network (e.g., network 170) and distribute the received signals to other user devices 110 via local WiFi network 115.

P2P application 520 may include hardware or a combination of hardware and software for identifying available content (e.g., from content server 140), providing content to other user devices 110, and/or obtaining content from other user devices 110. P2P application 520 may incorporate one or more transport and/or sharing protocols, such as BITTORRENT, FASTTRACK, Direct Connect, peer-to-peer television (P2PTV), Peer Distributed Transfer Protocol (PDTP), etc. In one implementation, P2P application 520 may enable distributed file sharing so that multiple user devices 110 may share and combine pieces of requested content. P2P application 520 may also include decryption capabilities to decrypt encrypted content provided, for example, from donor user device 110.

OS/applications 530 may include hardware or a combination of hardware and software for performing various support functions for other components of user device 110 and for providing different functionalities of user device 110. For example, OS/applications 530 may provide a browser as well as interfaces between the browser and the components in FIG. 2 (e.g., communication interface 260). In yet another example, OS/applications 530 may provide a TCP/IP stack to support communication applications, such as peer-to-peer application 520.

DRM agent 540 may include hardware or a combination of hardware and software that may retrieve security information from mobile server 120 to access content from content CDN 160. For example, DRM agent 540 may use P2P application 520 to help coordinate the receipt of DRM security information (e.g., from mobile server 120) with the secure content from another user device 110, such as from donor user device 110-1. Secure content may include, for example, music, images, video, and/or electronic books.

Although FIG. 5 shows example functional components of user device 110, in other implementations, user device 110 may include fewer functional components, different functional components, differently arranged functional components, and/or additional functional components than depicted in FIG. 5. Alternatively, or additionally, one or more functional components of user device 110 may perform one or more other tasks described as being performed by one or more other functional components of user device 110.

Figure 6:
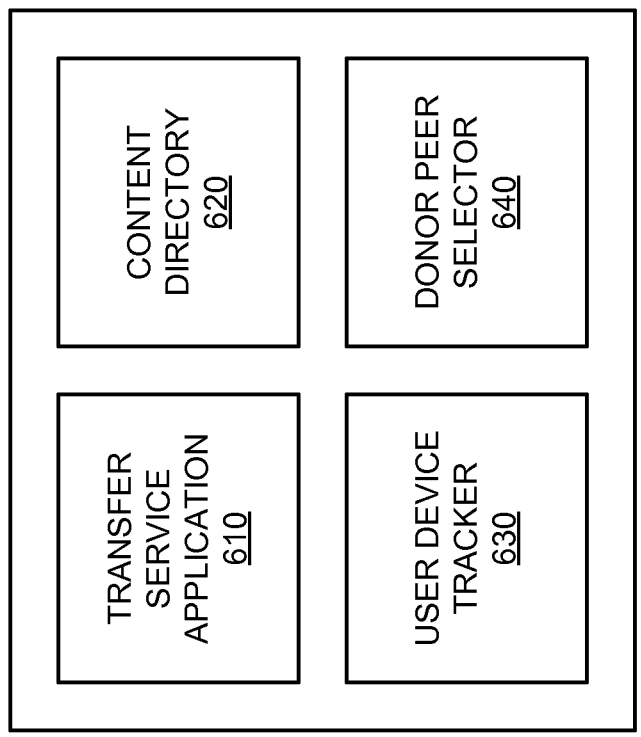
FIG. 6 is a diagram of example functional components of a mobile server of the network depicted in FIG. 1.

FIG. 6 is a diagram of example functional components of mobile server 120. In one implementation, the functions described in connection with FIG. 6 may be performed by one or more components of device 200 (FIG. 2). As shown in FIG. 6, mobile server 120 may include a transfer service application 610, a content directory 620, a user device tracker 630, and a donor peer selector 640.

Transfer service application 610 may include hardware or a combination of hardware and software to allow mobile server 120 to direct content transfers from a user's home network (e.g., home network 150) to user device 110 and from a user device 110 (e.g., a donor peer) to another user device 110 (e.g., a target peer). In one implementation, transfer service application 610 may receive credentials and/or other information from a user device 110 associated with a user to determine if the user is authorized to receive requested digital content. Credentials and other information may include, for example, a MDN for the user device, a personal access code for an STB associated with the requested content, an identifier for the STB associated with the requested content, a region identifier for the home network, and/or other information to facilitate a content request transaction. In another implementation, transfer service application 610 may receive a unique identifier associated with user device 110 and use the unique identifier to obtain account information for the user. Transfer server application 610 may send, to notification server 130, instructions to send a notification (e.g., "get" message 320) to an STB (e.g., STB 152) to perform a content request transaction.

Content directory 620 may include content references of content and/or links to content that may be retrieved by user devices 110. In one implementation, content directory 620 may include a single file with a list of content that may be accessed by user devices 110 and cross-referenced to user devices 110 that have downloaded particular content. In another implementation, content directory 620 may be accessed by or provided to STB server 140 to assist in authentication and/or verification processes.

User device tracker 630 may include hardware or a combination of hardware and software for tracking user device 110 locations (e.g., latitude and longitude, or another geographic position indication) and/or states (e.g., whether user devices 110 have MiFi capability and/or are currently connected to network 170). For example, user device tracker 630 may obtain location and/or state information from GPS updates provided by user devices 110. User device tracker 630 may also associate multiple user devices 110 within particular geographic areas to provide subsets of candidate donor peers for a target user device. In another implementation, user device tracker 630 may also track downloads by user devices 110 and record download activity in content directory 620.

Donor peer selector 640 may include hardware or a combination of hardware and software to select a donor user device (e.g., donor user device 110-1) in response to a content request (e.g., content request 330) from a target user device (e.g., target user device 110-2). In one implementation, donor peer selector 640 may identify potential donor peers that have previously downloaded the content identified in content request 330. Previous downloads may be identified, for example, based on information in content directory 620. Donor peer selector 640 may then select a particular donor peer from a geographic area near the target user device, based on location and/or state information from user device tracker 630. In another implementation, donor peer selector 640 may first identify potential donor peers based on location and/or state information and then select a particular donor peer based on the download records.

In one implementation, donor peer selector 640 may confirm content availability with the particular donor peer (e.g., donor user device 110-1) to verify the accuracy of content directory 620 (e.g., to confirm that particular downloaded content is still stored in a memory of the particular donor peer). For example, donor peer selector 640 may provide a file name or other indicator to the particular donor peer to determine if a match exists in the memory of the donor peer. Additionally, or alternatively, donor peer selector 640 may request a signal strength indication from the target user device 110 (e.g., the user device that initiated the content request). The signal strength indication may be used by donor peer selector 640 to determine a best available donor user device (e.g., a user device that has the requested content, has MiFi capability, and has the best signal for the target user device).

Although FIG. 6 shows example functional components of mobile server 120, in other implementations, mobile server 120 may include fewer functional components, different functional components, differently arranged functional components, and/or additional functional components than depicted in FIG. 6. Alternatively, or additionally, one or more functional components of mobile server 120 may perform one or more other tasks described as being performed by one or more other functional components of mobile server 120.

FIG. 7 is a flow chart of an example process 700 for providing mobile content delivery from a home network according to an implementation described herein. Process 700 may be performed by one or more of mobile server 120, notification server 130, and STB server 140. In another implementation, some or all of process 700 may be performed by another device or group of devices, including or excluding mobile server 120, notification server 130, and STB server 140.

As illustrated in FIG. 7, process 700 may include receiving, from a user device, a request for home network content (block 710), and sending a notify message to a device within the home network (block 720). For example, in implementations described above in connection with FIG. 3, user device 110-1 may send request 310, to mobile server 120, for content stored in within a home network (e.g., on or accessible to STB 152). In one implementation, user device 110-1 may communicate with mobile server 120 through a HTTPS layer using network 170. Mobile server 120 may receive request for content 310 and may generate "get" message 320 that may be sent, via notification server 130, to STB 152. "Get" message 320, may include, for example a ping-like message that causes STB 152 to establish a connection with STB server 140.

As further shown in FIG. 7, process 700 may include receiving, from a home network device, a request for content selection (block 730), and sending, to the home network device, a content selection from the user (block 740). For example, in implementations described above in connection with FIG. 3, mobile server 120 may forward request for content 310 to STB server 140. In response to "get" message 320, STB 152 may connect to STB server 140 and request additional information (e.g., a particular file name), as indicated by request content selection 330. For example, request content selection 330 may include a list of content available for downloading (e.g., content previously stored by or currently streamed to STB 152). Request content selection 330 may be forwarded by STB server 140 and mobile server 120 to user device 110-1 for presentation to the user. The user may select an item from the list of available content and user device 110-1 may forward the selection as content selection 340.

Returning to FIG. 7, process 700 may include sending content, to a CDN, based on the content selection (block 750), receiving, from the home network device, an indication of uploaded content (block 760), sending, to the user device, a URL for the requested content (block 770), and retrieving, from the CDN, the requested content (block 780). For example, in implementations described above in connection with FIG. 3, mobile server 120 may receive content selection 340 and forward content selection 340 to STB server 140, which, in turn, may forward content selection 340 to STB 152. In response to content selection 340, STB 152 may upload the requested content to CDN 160, as indicated by reference number 350. In one implementation, uploaded content 350 may be stored in a temporary storage location within CDN 160. Once STB 152 has completed uploading the requested content, STB 152 may send, to STB server 140, content uploaded signal 360 to indicate that the requested content (e.g., identified by content selection 340) has been uploaded to CDN 160. In one implementation, uploaded content signal 360 may include a file name, URL, or other identifier for the uploaded content. STB server 140 may forward uploaded content signal 360 to mobile server 120. Mobile server 120 may receive uploaded content signal 360 and, if necessary, combine uploaded content signal 360 with other information, to generate resource identifier 370. Resource identifier may include, for example, a URI or another address, to enable user device 110-1 to generate a request to CDN 160 to obtain the requested content. User device 110-1 may receive resource identifier 370, and may send, over a private network connection, a request for the desired content, as indicated by reference number 380.

FIG. 8 is a flow chart of an example process 800 for optimizing mobile content delivery with user devices according to another implementation described herein. In one implementation, process 800 may be performed by one or more of user device 110 and mobile server 120. In another implementation, some or all of process 800 may be performed by another device or group of devices, including or excluding user device 110 and mobile server 120.

As illustrated in FIG. 8, process 800 may include receiving, from a user device, a request for content (block 810), determining an available donor peer (block 820), and sending a donor peer identifier to the user device (block 830). For example, in implementations described above in connection with FIG. 4, target user device 110-2 may send content request 410 to mobile server 120 (e.g., using a URL for mobile server 120) to request desired content. In one implementation, target user device 110-2 may send content request 410 as a HTTPS data call over a 3G/4G wireless network via network 170. Mobile server 120 may check if there is a nearby user device (e.g., donor user device 110-1) with WiFi capability that that has already downloaded the content listed in content request 410. The content may be stored, for example, in a memory (e.g., memory 230) of donor user device 110-1. If a suitable donor peer (e.g., donor user device 110-1) is identified, mobile server 120 may direct, via donor identifier 420, target user device 110-2 to retrieve the requested content from donor user device 110-1.

As further shown in FIG. 8, process 800 may include retrieving content from the donor peer (block 840). For example, in implementations described above in connection with FIG. 4, target user device 110-2 may receive donor identifier 420 and may establish, based on donor identifier 420, a session to obtain shared content 430 from donor user device 110-1. In one implementation, donor user device 110-1 may share the content requested by target user device 110-2 over a local wireless network (e.g., WiFi network 115). In one implementation, any of user devices 110-1 through 110-4 (e.g., a user device with MiFi capability) may act as an HTTP server to deliver content to a target user device 110 requesting the same content. Thus, multiple user devices 110 may provide a mesh MiFi network (e.g., as directed by mobile server 120) to share content with mobile peers. In another implementation, user devices 110-1 through 110-4 may act as both donor peers and target peers.

Systems and/or methods described herein may allow users to view content (e.g., recorded or live video, etc.) from a mobile user device. Content may be retrieved from a user's home network. Because the home network is typically not accessible from the Internet (e.g., for security purposes), the systems and/or methods may use a notification server to provide a ping-like notification to alert a device within the home network (e.g., a STB) that a request for content has been made. In response to the notification, the home network device may initiate a session with another server to identify the requested content and to upload the requested content to a content delivery network. The uploaded content may then be retrieved by the mobile user device. In the systems and/or methods herein, the mobile device may also serve as a donor peer to provide the content to other requesting devices via a local WiFi network.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7 and 8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by one or more devices in a network, the method comprising:
   receiving, by a first one of the devices and from a user device, a request for content from a home network, where the request originates via a wireless access network;
   providing, by the first one of the devices and to a second one of the devices, a message to initiate a notification of the request for content to a home network device;
   sending, by the second one of the devices, the notification of the request for content to the home network device, wherein the notification of the request for content causes the home network device to initiate a session with a third one of the devices;
   receiving, by the third one of the devices and from the home network device, a request for user selection of particular content;
   sending, by the third one of the devices and to the home network device, a content selection received from the user device;
   receiving, by the second one of the devices and from the home network device, an indication that the content corresponding to the content selection has been uploaded to a content delivery network; and
   sending, by the first one of the devices and to the user device, instructions to retrieve the content from the content delivery network.

2. The method of claim 1, further comprising
   storing, in a temporary storage device of the content delivery network, content corresponding to the content selection.

3. The method of claim 1, further comprising:
   providing, by the home network device and to the content delivery network, the content corresponding to the content selection over a closed content distribution channel.

4. The method of claim 1, further comprising:
   receiving, from a different user device, a request for the content corresponding to the content selection;
   determining an available donor peer, within a local wireless network, for the content corresponding to the content selection; and
   sending, to the different user device, an identifier for the donor peer.

5. The method of claim 4, where the local wireless network is a mobile WiFi network.

6. The method of claim 4, where determining an available donor peer comprises:
   identifying, as potential donor peers, one or more user devices with mobile WiFi capability that have previously downloaded the content corresponding to the content selection;
   identifying, from the potential donor peers, one or more user devices within WiFi signal range of the different user device; and
   selecting the donor peer based on the identifying potential donor peers and the identifying the one or more user devices within WiFi signal range.

7. The method of claim 6, where determining an available donor peer further comprises one or more of:
   confirming, with the donor peer, that the content is stored in a memory of the donor peer; or
   requesting, from the different user device, signal strength readings for the potential donor peers.

8. The method of claim 1, where the home network device is a set-top box.

9. The method of claim 1, further comprising:
   retrieving, via the wireless access network and from the content delivery network, the content corresponding to the content selection, and
   presenting, to a user of the user device, the content corresponding to the content selection.

10. One or more devices, comprising:
    a memory to store a plurality of instructions; and
    one or more processors to execute instructions in the memory to:
    receive, from a user device, a request for content from a home network,
    send a notification of the request for content to a home network device, wherein the notification of the request for content causes the home network device to initiate a session with one of the one or more devices,
    receive, from the home network device and in response to the notification, a selection list of particular content,
    provide, to the user device, the selection list,
    receive, from the user device, a content selection from the selection list,
    send, to the home network device, the content selection,
    receive, from the home network device, an indication that content corresponding to the content selection has been uploaded to a content delivery network, and
    send, to the user device, instructions to retrieve the content from the content delivery network.

11. The one or more devices of claim 10, where the one or more processors are further to execute instructions to:
    store the content corresponding to the content selection.

12. The one or more devices of claim 10, where the user device includes one of:
    a radiotelephone,
    a personal communications system (PCS) terminal,
    a personal digital assistant (PDA),
    a wireless device,
    a smart phone,
    a laptop computer, or
    a global positioning system (GPS) device.

13. The one or more devices of claim 10, where the one or more processors are further to execute instructions to:
- receive from a target user device another request for the content corresponding to the content selection,
- determine an available donor peer, within a local wireless network, for the content corresponding to the content selection, and
- send, to the target user device, an identifier for the donor peer.

14. The one or more devices of claim 10, where the instructions to retrieve the content from the content delivery network include:
- a uniform resource identifier (URI),
- an Internet protocol (IP) address, or
- a private network address.

15. A method, comprising:
- receiving, by a server device and from a first user device via a wireless access network, a request for content from a home network;
- receiving, by the server device and from a second user device via the wireless access network, a request for the content;
- sending, by the server device, a notification of the request for content to a home network device associated with the home network, wherein the notification of the request for content causes the home network device to initiate a session with the server device;
- receiving, by the server device and from the home network device, an indication that the content corresponding to the content selection has been uploaded to a content delivery network;
- sending, by the server device and to the first user device, instructions to retrieve a first portion the content from the content delivery network; and
- sending, by the server device and to the second user device, instructions to retrieve a second portion the content from the content delivery network, where the instructions to retrieve the first portion and the instructions to retrieve the second portion further include instructions to share the first portion and the second portion via a mobile local wireless network.

16. The method of claim 15, further comprising:
storing, within the content delivery network, the content.

17. The method of claim 15, where the local wireless network is a mobile WiFi network.

18. The method of claim 15, further comprising:
receiving, at the content delivery network and via a closed content distribution channel, the content.

19. A system, comprising:
- a device, within a home network, including:
  - a memory to store content, and
  - a processor to provide the stored content to a content delivery server; and
- a server device including one or more processors to:
  - receive, from a user device, a request for the stored content within the home network,
  - indicate, to the device within the home network, that a request for content has been made, wherein the indication causes the device within the home network to initiate a session with the server device, and
  - provide, to the device within the home network, a user's selection of particular content,
- a receiver to receive, from the home network device, an indication that the particular content has been uploaded to the content delivery server, and
- a transmitter to send, to the user device, instructions to retrieve the particular content from the content delivery server.

20. The system of claim 19, wherein the one or more processors of the server device is further to:
provide, to another user device, instructions to retrieve the particular content from the user device.

* * * * *